United States Patent
Ojima et al.

(10) Patent No.: US 10,889,325 B2
(45) Date of Patent: Jan. 12, 2021

(54) VEHICLE STEERING SYSTEM

(71) Applicant: HONDA MOTOR CO., LTD., Tokyo (JP)

(72) Inventors: Yosuke Ojima, Wako (JP); Takashi Yanagi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 29 days.

(21) Appl. No.: 16/276,835

(22) Filed: Feb. 15, 2019

(65) Prior Publication Data

US 2019/0256145 A1 Aug. 22, 2019

(30) Foreign Application Priority Data

Feb. 20, 2018 (JP) .................. 2018-027733

(51) Int. Cl.
*B62D 17/00* (2006.01)
*B60G 7/00* (2006.01)
*B62D 7/14* (2006.01)

(52) U.S. Cl.
CPC ............. *B62D 17/00* (2013.01); *B60G 7/006* (2013.01); *B62D 7/146* (2013.01); *B60G 2200/4622* (2013.01)

(58) Field of Classification Search
CPC .... B62D 17/00; B62D 7/146; B60G 17/0162; B60G 7/006; B60G 17/005; B60G 2202/42; B60G 2204/46; B60G 2200/4622; B60G 2200/44
USPC ................... 280/5.52, 5.522, 86.758
See application file for complete search history.

(56) References Cited

U.S. PATENT DOCUMENTS

| | | | | |
|---|---|---|---|---|
| 5,143,400 A * | 9/1992 | Miller | .................. | B62D 17/00 180/413 |
| 5,282,644 A * | 2/1994 | Larson | ................ | B60B 35/001 180/209 |
| 6,386,553 B2 * | 5/2002 | Zetterstrom | ............ | B60G 3/20 180/413 |
| 7,416,264 B2 * | 8/2008 | Tsukasaki | ................ | B60T 7/10 180/402 |
| 8,050,819 B2 * | 11/2011 | Suyama | ............. | B60W 30/025 280/5.5 |
| 8,073,592 B2 * | 12/2011 | Nishimori | ............. | B60G 7/003 180/404 |
| 8,463,506 B2 * | 6/2013 | Yanagi | .............. | B60G 17/0164 701/49 |
| 8,583,328 B2 * | 11/2013 | Mori | ..................... | B62D 17/00 280/5.522 |
| 8,825,303 B1 * | 9/2014 | Racine | .................. | G01B 21/26 701/42 |

(Continued)

FOREIGN PATENT DOCUMENTS

JP 2009-173192 A 8/2009

*Primary Examiner* — Toan C To
(74) *Attorney, Agent, or Firm* — Rankin, Hill & Clark LLP

(57) ABSTRACT

A vehicle steering system includes: actuators, respectively provided for wheels, for changing toe angles of the wheels; lock devices, respectively provided for the wheels, for restricting changes in the toe angles of the wheels; and a control device for controlling the actuators and the lock devices. For each lock device, the control device at a time performs an individual unlocking operation of unlocking the lock device, and a lock relaxation operation of relaxing a locked state of the lock device.

3 Claims, 5 Drawing Sheets

(56) References Cited

U.S. PATENT DOCUMENTS

| | | | | |
|---|---|---|---|---|
| 8,960,690 B2* | 2/2015 | Hinohara | ............... | B62D 17/00 |
| | | | | 280/5.522 |
| 9,187,126 B2* | 11/2015 | Kawauchi | .............. | B60G 7/006 |
| 2015/0217618 A1* | 8/2015 | Dorrestijn | .............. | B62D 7/146 |
| | | | | 280/5.52 |
| 2018/0201319 A1* | 7/2018 | Rogers | ................... | B62D 17/00 |

* cited by examiner

VEHICLE STEERING SYSTEM

BACKGROUND OF THE INVENTION

1. Field of the Invention

The present invention relates to a vehicle steering system for controlling toe angles of wheels.

2. Description of the Related Art

A vehicle is equipped with various vehicle behavior controllers for controlling the behavior of a vehicle body for the purpose of enhancing the running stability of the vehicle, for example. Among the known vehicle behavior controllers is, for example, a controller for performing a rear wheel toe angle control (hereinafter abbreviated to as "RTC" standing for rear toe control) which enhances the turn performance and running stability of the vehicle by controlling toe angles of the left and right rear wheels (see Japanese Patent Application Publication No. 2009-173192).

The RTC is performed to control the toe angles of the rear wheels in response to motion conditions such as a vehicle speed, a front wheel steering angle and a braking condition, and to change the toe angles stepwise in response to the vehicle speed and the front wheel steering angle. This technology makes it possible to enhance the turnability of the vehicle while the vehicle is running at slow speed, and the running stability of the vehicle while the vehicle is running at high speed. The technology accordingly makes it possible to effectively prevent the fishtailing of the vehicle body while the vehicle is turning, and a decrease in the running stability while the vehicle is braking.

SUMMARY OF THE INVENTION

Actuators, included in the RTC, for changing the toe angles are provided with lock mechanisms for preventing unexpected changes in the toe angles during times such as while the vehicle is parked. Since the actuators include the lock mechanisms, the sizes of the actuators are larger than otherwise. For this reason, the actuators are arranged on the sides of the wheels where there is relatively large room for the installation space, but not on the side of the vehicle body.

However, the arrangement of heavy members such as the actuators under the springs worsens the road surface tracking performance of the wheels, and accordingly the ride comfort. For this reason, there has been demand that the actuators are arranged on the side of the vehicle body.

The present invention has been made to solve the above problems. The object of the present invention is to provide a vehicle steering system whose size and weight can be reduced.

For the purpose of achieving the above object, the vehicle steering system according to the present invention includes: actuators, respectively provided for multiple wheels included in a vehicle, for changing toe angles of the wheels; lock devices, respectively provided for the wheels, for restricting changes in the toe angles of the wheels; and a control device for controlling the actuators and the lock devices. For each lock device, the control device at a time performs an individual unlocking operation of unlocking the lock device, and a lock relaxation operation of relaxing a locked state of the lock device.

The present invention can provide the vehicle steering system whose size and weight can be reduced.

DETAILED DESCRIPTION OF THE EMBODIMENTS

An embodiment of the present invention will be hereinafter described in detail with reference to the accompanying drawings. Incidentally, the same components will be denoted by the same reference signs, and duplicated descriptions will be omitted.

Figure 1:
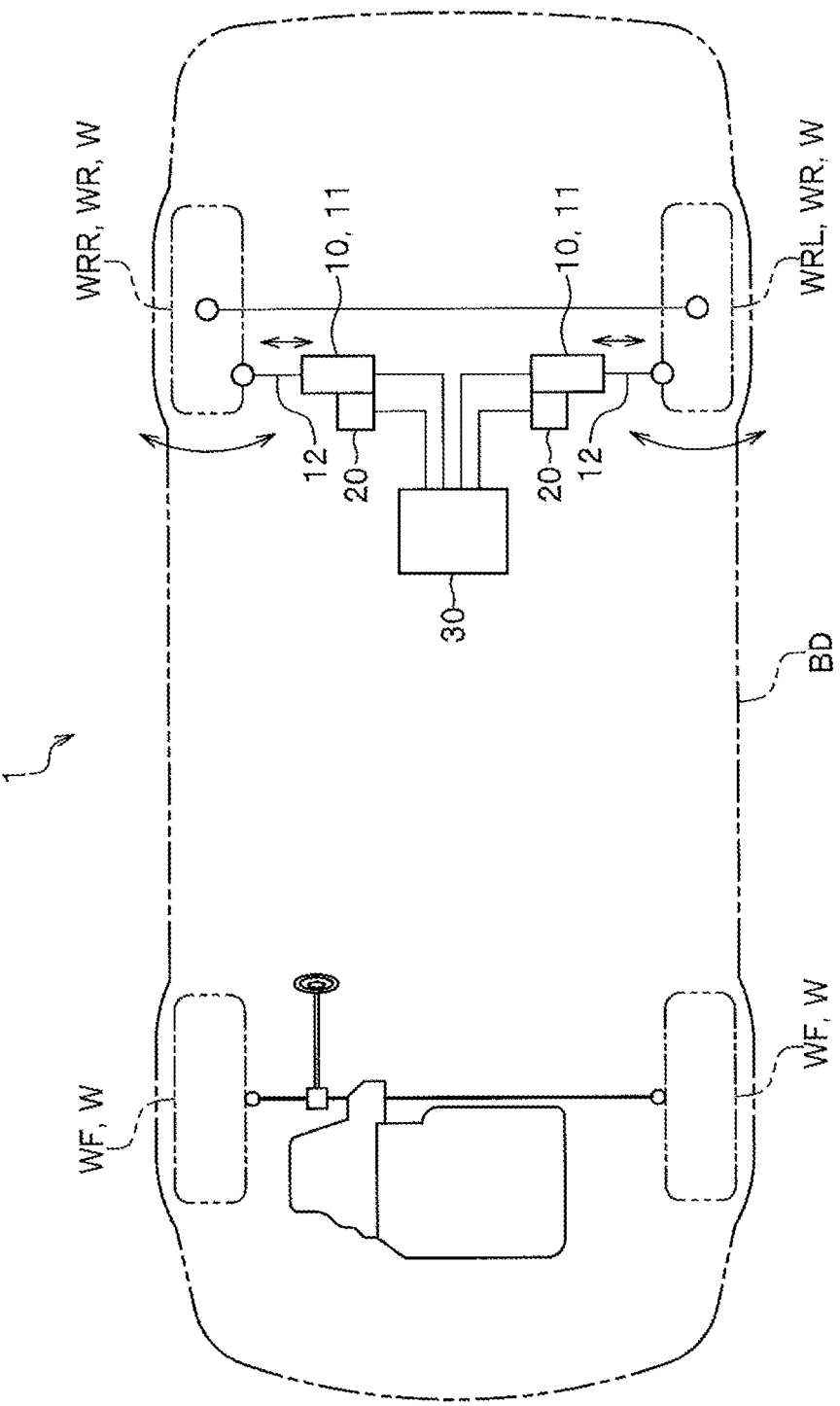
FIG. 1 is a schematic diagram illustrating a configuration of a vehicle steering system according to an embodiment.
Figure 2:
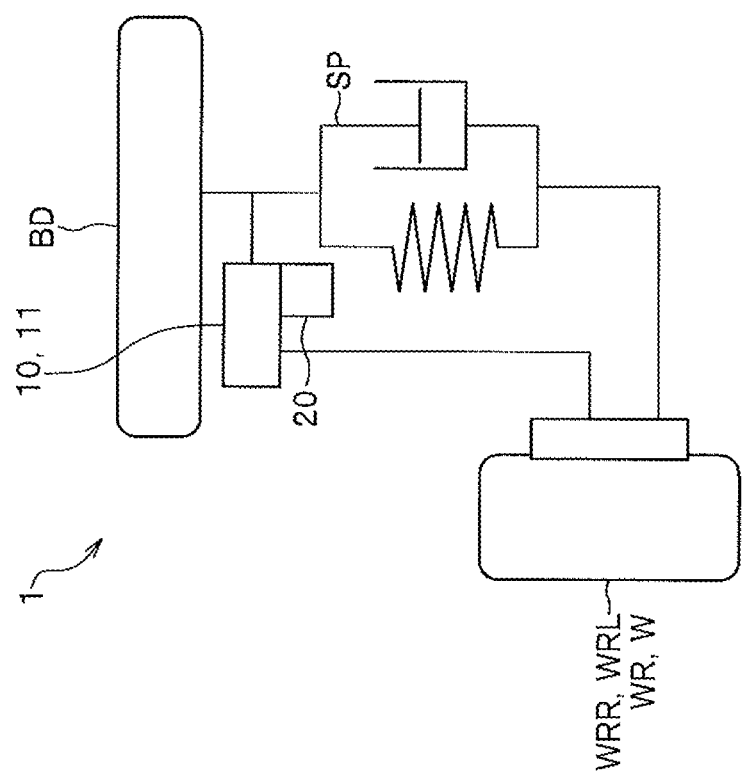
FIG. 2 is a schematic diagram illustrating how to set the vehicle steering system according to the embodiment.

As illustrated in FIG. 1, a vehicle steering system 1 according to the embodiment controls toe angles of rear wheels WR other than front wheels WF which are steering wheels. In addition, as illustrated in FIG. 2, the vehicle steering system 1 is arranged on the side of a vehicle body BD relative to suspensions SP with which the wheels W are supported by the vehicle body BD.

The vehicle steering system 1 includes actuators 10, lock devices 20, and a control device 30.

It should be noted that in the embodiment, the rear wheels WR include a right rear wheel WRR and a left rear wheel WRL.

Thus, in the vehicle steering system 1 according to the embodiment, two actuators 10 and two lock devices 20 are arranged in the left and right of the vehicle, and the single control device 30 controls the actuators 10 and the lock devices 20.

As illustrated in FIG. 1, each actuator 10 includes a motor 11, and a feed screw mechanism 12.

The motor 11 is set rotatable forward and backward, and is arranged linked with the feed screw mechanism 12.

Depending on the forward and backward rotation of the motor 11, the actuator 10 extends and retracts the feed screw mechanism 12, and thereby adjusts the left and right directions of the toe angle, and the amount of angle degrees.

Figure 3:
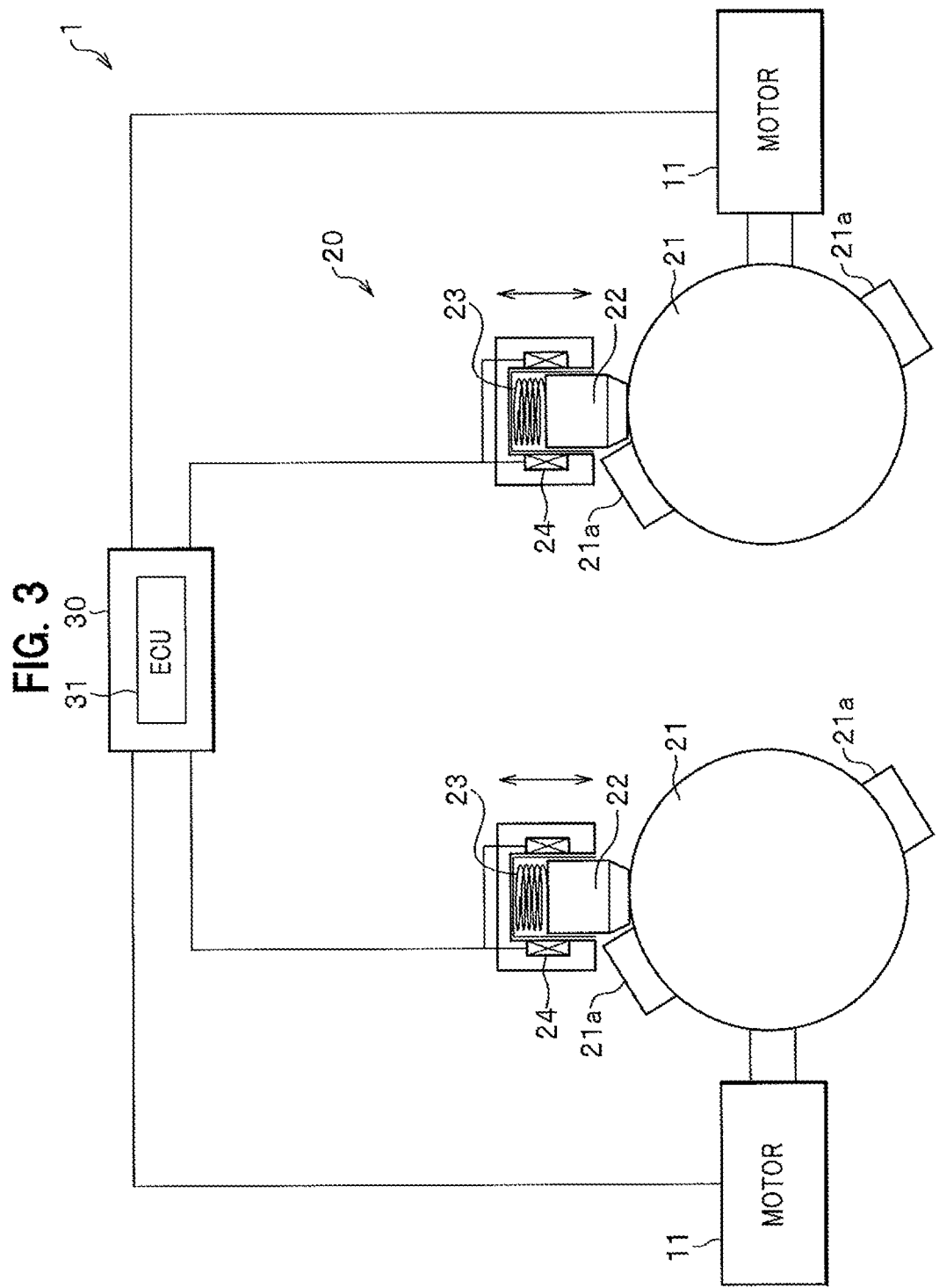
FIG. 3 is a schematic diagram illustrating the configuration of the vehicle steering system according to an embodiment.

Next, descriptions will be provided for the lock devices 20 (see FIG. 1 and FIG. 3).

The lock devices 20 are respectively provided for the right rear wheel WRR and the left rear wheel WRL.

Each lock device 20 includes a receiver 21, a lock pin 22, a pin spring 23, and an electromagnetic solenoid 24.

The receiver 21 is formed integrally with the output shaft (not illustrated) of the corresponding motor 11, and rotates together with the output shaft.

In addition, the receiver 21 includes engagement protrusions 21a.

The lock pin 22 is made from a shaft-shaped member, and is arranged movably between an engagement position and a retraction position.

At the engagement position, the lock pin 22 engages with one of the engagement protrusions 21a of the receiver 21, and thereby restricts the rotation of the receiver 21 and the rotation of the motor 11.

At the retraction position, the lock pin 22 stays away from the engagement protrusions 21a, and allows the receiver 21 and the motor 11 to rotate.

The pin spring 23 serves as biasing means, and biases the lock pin 22 to hold the lock pin 22 toward the engagement position.

When electrified, the electromagnetic solenoid 24 generates a magnetic power, and thereby attracts the lock pin 22 to the retraction position.

In other words, the lock pin 22 is held in a state of being at the engagement position, and engages with one of the engagement protrusion 21a. Thereby, the lock pin 22 restricts the rotation of the motor 11 (a locked state).

Meanwhile, only when the electromagnetic solenoid 24 is electrified, the lock pin 22 moves to the retraction position, and allows the motor 11 to rotate (an unlocked state).

Next, descriptions will be provided for the control device 30 (see FIG. 1 and FIG. 3).

The control device 30 includes an electronic control unit (ECU) 31.

The ECU 31 controls the actuators 10 (the motors 11) and the lock devices 20.

The ECU performs a simultaneous unlocking operation, an individual unlocking operation, and a lock relaxation operation.

In the simultaneous unlocking operation, the ECU unlocks all the lock devices 20.

In other words, the ECU 31 electrifies all the electromagnetic solenoids 24 simultaneously, and thereby attracts all the lock pins 22 to their respective retraction positions.

In the individual unlocking operation, the ECU 31 sequentially unlocks the lock devices 20 on a one-by-one basis.

In other words, the ECU 31 sequentially electrifies the electromagnetic solenoids 24, and thereby attracts the lock pins 22 to their respective retraction positions on a one-by-one basis.

In the lock relaxation operation, the ECU 31 relaxes the meshing between the engagement protrusions 21a and the lock pins 22, and thereby makes it easy to pull the lock pin 22 away from the engagement protrusion 21a.

In other words, the ECU 31 rotates the motors 11 forward and the receivers 21 backward, and vice versa. Thereby, the ECU 31 turns the toe angles to the left or the right, and relaxes the engagement between the engagement protrusions 21a and the respective lock pins 22.

Figure 4:
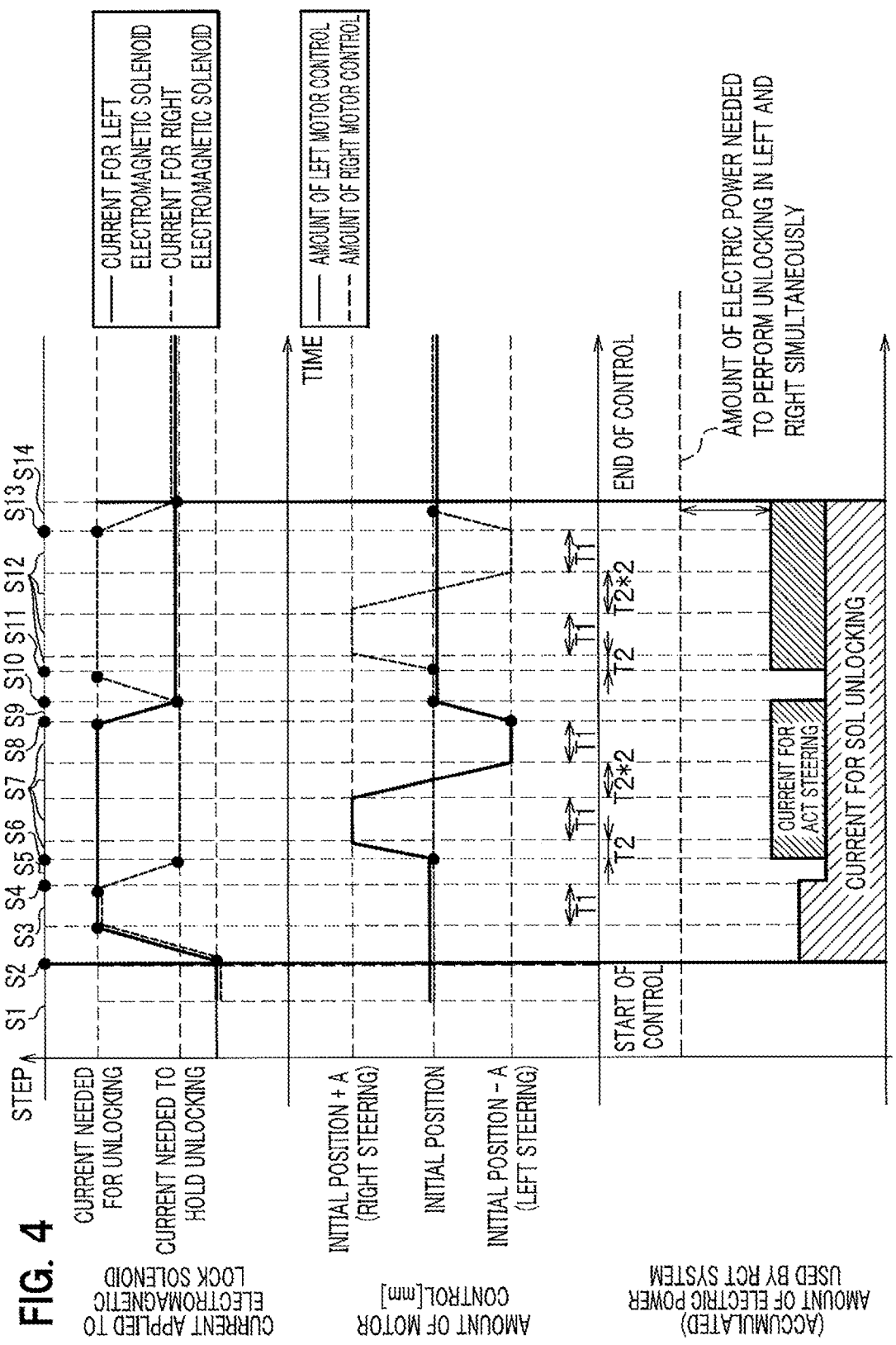
FIG. 4 is a time chart illustrating how the vehicle steering system according to the embodiment works.
Figure 5:
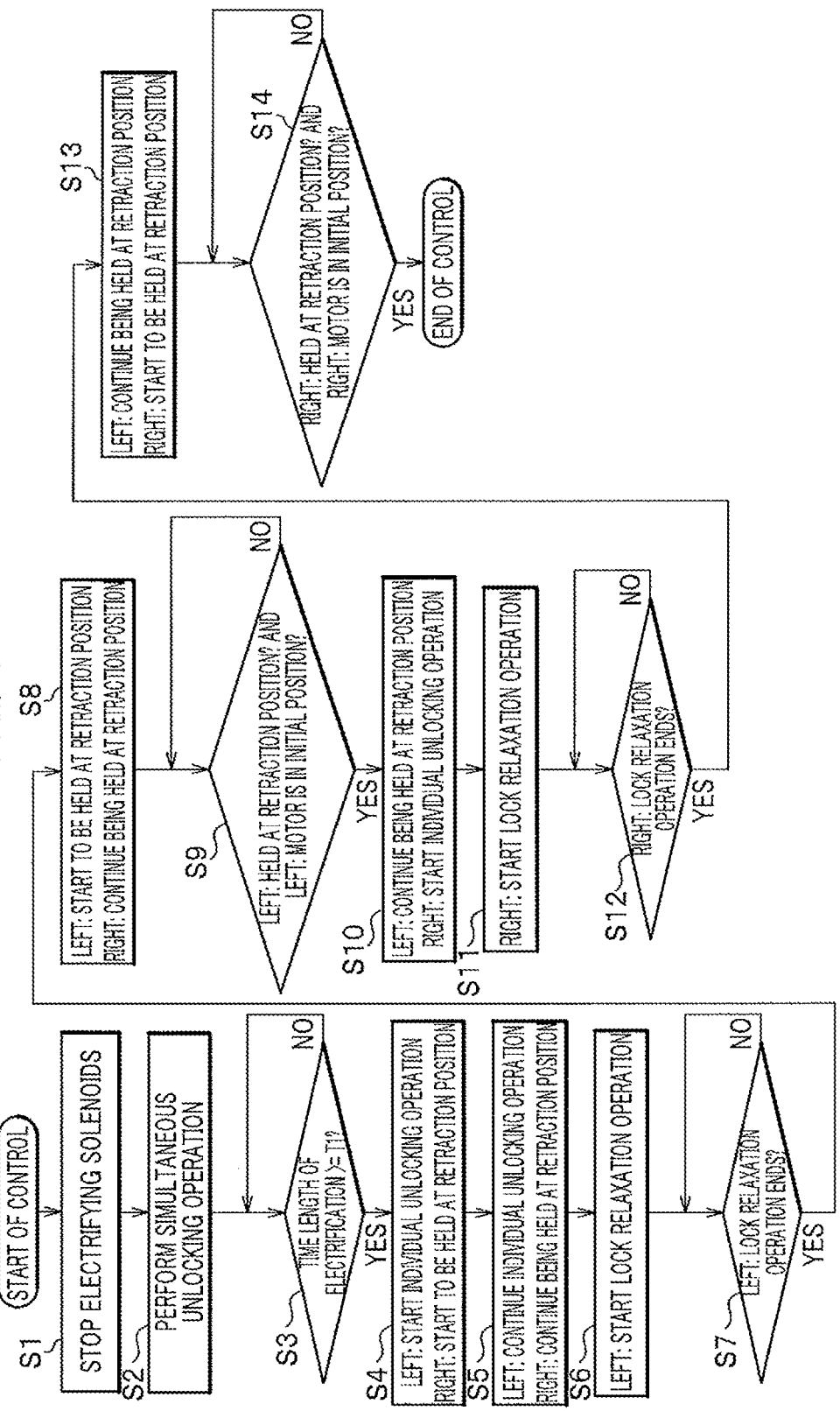
FIG. 5 is a flowchart illustrating how the vehicle steering system according to the embodiment works.

Next, descriptions will be provided for how the vehicle steering system 1 works (see FIG. 4 and FIG. 5).

First of all, in step S1, an ignition is off, and all the electromagnetic solenoids 24 are not electrified. Thus, the pin springs 23 biases all the lock pins 22 to hold the lock pins 22 at their respective engagement positions. Thereby, the lock pins 22 engage with the engagement protrusions 21a of the receivers 21, and accordingly restrict the rotation of the motors 11 (the locked state).

Thereafter, once the ignition turns on, the ECU 31 performs the simultaneous unlocking operation (step S2 and step S3).

In the simultaneous unlocking operation, all the electromagnetic solenoids 24 are supplied with electric power for the electromagnetic solenoids 24 to pull the respective lock pins 22 (step S2).

Subsequently, the length of electrification time is measured, and all the electromagnetic solenoids 24 continue being electrified until a predetermined length T1 of time passes (step S3).

By this, all the lock pins 22 are attracted toward their respective retraction positions.

Thus, a lock pin 22 out of engagement with the corresponding engagement protrusion 21a, and a lock pin 22 in engagement with the corresponding engagement protrusion 21a with a weak engagement force move to their respective retraction position.

Meanwhile, in a case where the engagement protrusions 21a and the lock pins 22 mesh with each other (in a case where their engagement forces are strong), the lock pins 22 are held at their respective engagement positions.

Next, descriptions will be provided for how the individual unlocking operation and the lock relaxation operation are performed on the left rear wheel WRL (step S4 to step S9).

To begin with, the electromagnetic solenoid 24 on the side of the right rear wheel WRR is supplied with electric power for the electromagnetic solenoid 24 to hold the lock pin 22 at the retraction position (steps S4 and S5).

By this, only in a case where the lock pin 22 of the right rear wheel WRR has already moved to the retraction position, the lock pin 22 is held at the retraction position.

Meanwhile, at steps S4 and S5, the electromagnetic solenoid 24 on the side of the left rear wheel WRL is supplied with electric power for the electromagnetic solenoid 24 to attract the lock pin 22 to the retraction position (the start of the individual unlocking operation).

Thereafter, while the electromagnetic solenoids 24 continue being electrified, and the motor 11 of the left rear wheel WRL is driven (steps S6 and S7).

Before the motor 11 is driven, the toe angle is turned rightward by a predetermined amount of angle degrees, is held there for the predetermined length T1 of time, is thereafter turned leftward by the predetermined amount of angle degrees, and held there for the predetermined length T1 of time; and the motor 11 is returned to the initial position (the lock relaxation operation).

This combination of the individual unlocking operation and the lock relaxation operation relaxes the meshing between the lock pin 22 and the engagement protrusion 21a of the left rear wheel WRL, and moves the lock pin 22 to the retraction position.

While the electromagnetic solenoid 24 on the side of the right rear wheel WRR continues being supplied with the electric power for the electromagnetic solenoid 24 to hold the corresponding lock pin 22 at the retraction position, the electromagnetic solenoid 24 on the side of the left rear wheel WRL is supplied with electric power for the electromagnetic solenoid 24 to hold the corresponding lock pin 22 at the retraction position (step S8).

Thereafter, while the lock pin 22 of the left rear wheel WRL remains held at the retraction position, it is checked whether the lock relaxation operation for the left rear wheel WRL is completed and the motor 11 is at the initial position (step S9).

After that, the individual unlocking operation and the lock relaxation operation are performed on the right rear wheel WRR (step S10 to step S14).

To begin with, the electromagnetic solenoid 24 on the side of the left rear wheel WRL continues being supplied with electric power for the electromagnetic solenoid 24 to hold the corresponding lock pin 22 at the retraction position (step S10).

By this, the lock pin 22 of the right rear wheel WRL having already moved to the retraction position remains held at the retraction position.

Meanwhile, at step S10, the electromagnetic solenoid 24 on the side of the right rear wheel WRR is supplied with electric power for the electromagnetic solenoid 24 to attract the corresponding lock pin 22 to the retraction position (the start of the individual unlocking operation).

Thereafter, while the electromagnetic solenoids 24 continue being electrified, the motor 11 of the right rear wheel WRR is driven (steps S11 and S12).

Before the motor 11 is driven, the toe angle is turned rightward by the predetermined amount of angle degrees in a way that it takes a predetermined length T2 of time to turn the toe angle rightward by the predetermined amount of angle degrees, is held there for the predetermined length T1 of time, and is thereafter turned leftward by the predetermined amount of angle degrees.

The toe angle is held at the predetermined amount of angle degrees in the left for the predetermined length T1 of time, and the motor 11 is returned to the initial position in a way that it takes the predetermined length T2 of time to return the motor 11 to the initial position (the lock relaxation operation).

The combination of the individual unlocking operation and the lock relaxation operation relaxes the meshing between the lock pin 22 and the engagement protrusion 21a of the right rear wheel WRR, and moves the lock pin 22 to the retraction position.

While the electromagnetic solenoid 24 on the side of the left rear wheel WRL continues being supplied with the electric power for the electromagnetic solenoid 24 to hold the corresponding lock pin 22 at the retraction position, the electromagnetic solenoid 24 on the side of the right rear wheel WRR is supplied with electric power for the electromagnetic solenoid 24 to hold the lock pin 22 at the retraction position (step S13).

Thereafter, it is checked whether the lock relaxation operation for the right rear wheel WRR is completed (step S14).

Eventually, the control is terminated while the electromagnetic solenoids continue being supplied with the electric power for the electromagnetic solenoids to hold the left and right lock pins 22 at their respective retraction positions.

As illustrated in a lower part of a time chart of FIG. 4, the vehicle steering system 1 according to the embodiment can make the peak of the power consumption lower than a case where the lock devices for all the wheels W are unlocked by performing the simultaneous unlocking operation and the lock relaxation operation at the same time.

It should be noted that the electric power used to attract each lock pin 22 to the retraction position, and the electric power used to hold the lock pin 22 at the retraction position are set in a way to satisfy (the electric power used to attract each lock pin 22 to the retraction position)>(the electric power used to hold the lock pin 22 at the retraction position).

This makes it possible to employ the electromagnetic solenoids 24 with a smaller volume, to reduce the size and weight of the system as a whole, and accordingly to install the system in the vehicle body VB.

Next, descriptions will be provided for the working and effects of the vehicle steering system 1 according to the embodiment.

In the embodiment, since the unlocking is performed individually in the left and the right, even the small system volume makes it possible for the vehicle steering system to unlock the lock devices securely.

In the embodiment, since the individual unlocking operation is performed after the simultaneous unlocking operation, it is possible to reduce the number of times unlocking noises are generated when the lock devices are unlocked.

For this reason, it is possible to enhance the marketability.

In the embodiment, since the actuators 10 and the lock devices 20 are arranged on the side of the vehicle body relative to the suspensions SP.

This makes it possible to make the unsprung load of each suspension SP smaller and the ride comfort better than the configuration in which the actuators 10 and the lock devices 20 are arranged on the sides of the wheels W.

Each lock device 20 according to the embodiment includes: the receiver 21 which is configured to be displaced in response to a change in the toe angle of the corresponding wheel W; and the lock pin 22 which is arranged disengageable from the receiver 21.

This makes it possible to build the lock device 20 with the relatively simple configuration, and to reduce the size and weight further.

What is claimed is:

1. A vehicle steering system comprising:
    actuators, respectively provided for a plurality of wheels included in a vehicle, for changing toe angles of the wheels;
    lock devices, respectively provided for the wheels, for restricting changes in the toe angles of the wheels; and
    a control device for controlling the actuators and the lock devices, wherein
    for each lock device, the control device at a time performs an individual unlocking operation of unlocking the lock device, and a lock relaxation operation of relaxing a locked state of the lock device, after a simultaneous unlocking operation of unlocking all the lock devices.

2. The vehicle steering system according to claim 1, wherein the actuators and the lock devices are arranged on a side of a vehicle body relative to suspensions with which the wheels are supported by the vehicle body.

3. The vehicle steering system according to claim 1, wherein the lock devices include
    receivers, respectively provided for the wheels, and configured to be displaced in response to the changes in the toe angles of the wheels, and
    lock pins, respectively provided for the receivers disengageably, for restricting the displacements of the receivers when the lock devices come into engagement.

* * * * *